Dec. 12, 1933.  C. J. SITTINGER  1,939,145
POWER CONTROL OF INTERCONNECTED ELECTRIC
GENERATING AND DISTRIBUTING SYSTEMS
Filed March 5, 1931  2 Sheets-Sheet 1

Inventor.
Carl J. Sittinger
by
atty

Dec. 12, 1933. C. J. SITTINGER 1,939,145
POWER CONTROL OF INTERCONNECTED ELECTRIC
GENERATING AND DISTRIBUTING SYSTEMS
Filed March 5, 1931 2 Sheets-Sheet 2

Inventor:
Carl J. Sittinger
by
atty

Patented Dec. 12, 1933

1,939,145

UNITED STATES PATENT OFFICE 1,939,145

POWER CONTROL OF INTERCONNECTED ELECTRIC GENERATING AND DISTRIBUTING SYSTEMS

Carl J. Sittinger, Winchester, Mass.

Application March 5, 1931. Serial No. 520,226

20 Claims. (Cl. 172—238)

This invention relates to interconnected electric generating and distributing systems and to apparatus for closely controlling the flow or exchange of alternating current power between the systems over specific circuits.

In accordance with modern practice, various independent power generating and distributing systems are becoming more and more interconnected. Among some of the more difficult problems which are brought about by such interconnection is the control of power flow over a certain specific circuit or circuits necessary because of contractual relations or because of physical or economic limitations of the circuit. Similar problems also exist within a single independent system consisting of an extensive transmission and distributive network and scattered generating stations and scattered load centers.

The problem of control of power flow may best be analyzed by simplifying the network into two parallel circuits connecting the sending and receiving points, one circuit being the electrical equivalent of the circuit or circuits over which control of power flow is desired and the other circuit being the electrical equivalent of balance of the interconnected system. While apparatus has been developed to accomplish this control over simple parallel circuits with power generation at one end only and free from intermediate loads, generating stations at other parts of the network and intermediate loads which are generally present in interconnected networks introduce such additional burden upon the power control equipment as to make the present-day design practically inadequate for the use of close control of power flow.

In the case of simple parallel circuits a regulating type of transformer capable of compensating for the change in voltage and phase angle shift corresponding to that caused by the power flow of the controlled circuit is sufficient. With the more involved problem of interconnected network, however, it will be found that an initial difference in voltage and phase angle commonly exists between the two ends of the circuit over which power control is desired. This difference in voltage and phase angle may vary over wide limits, positive and negative, because of the numerous intermediate and scattered load centers and because of the numerous generating stations located at scattered points throughout the system. This initial variation in voltage and phase angle may be and generally is of a magnitude much greater than that required to be provided by the regulating transformer for power control so that, if the transformer is calculated and installed on the basis of the requirements of the simple equivalent parallel circuit, close control will be possible only at the improbable time when both ends of the circuit are equal in voltage and are in phase. On the other hand, if the existing type of control equipment is made satisfactory to allow for the inherent system variation in voltage and phase, as would be necessary, commercially close control of power flow would be impossible. This is obvious when it is realized that if say seventeen taps of a regulating transformer will handle the complete range of variation perhaps three taps will be needed to handle the load change and consequently the load may be controlled only within 33% of the desired amount.

The regulating transformers as now developed consist of some source of variable voltage, generally a set of exciting transformers with their primary or exciting windings connected across the supplying system and secondary windings that have a plurality of taps, usually seventeen in number for each winding, so that a plurality of different voltages are available. This variable voltage is applied to the primaries of a set of series transformers the secondaries of which are in series with the interconnecting conductors for supplying an in-phase buck or boost potential thereto. The same variable voltage is also similarly applied to a second set of similarly arranged series transformers which are connected so as to impress an out-of-phase buck or boost phase and power-varying voltage on the interconnecting conductors. Each set of series transformers can be connected independently between any selected taps of the variable voltage supply so that a certain degree of control of the voltage, phase and amount of the exchanged power can be obtained.

An extremely fine degree of control of voltage and phase by the present type of regulating transformer is not possible since the voltage can be controlled only by steps of considerable voltage difference. As a consequence, it is not possible accurately to match the two interconnected systems for phase coincidence and at the same time to control the amount of exchanged power as closely as may be commercially desired. In many interconnected systems, it would not be possible to control the flow of interconnected power except in steps of ten or more thousand kilowatts which, obviously, is a much coarser control than would be desired. This is due to the fact that the regulating transformer, besides taking care of the phase shift necessary for power control must also allow for the inherent phase difference at both ends of the controlled circuit, which may be of a magnitude many times greater than the phase shift for power control.

The only equipment now developed which will, under certain conditions, permit satisfactory control of voltage and phase relations is a combination of two induction regulators, the magnetizing windings of each of which are energized from the power-supplying system and the angularly-adjustable secondary windings of each of which are connected in series with each other and in series with the conductors of the interconnecting circuit. Thus, by varying the angular relation of the shiftable windings, a variable buck or boost voltage can be superimposed on the interconnecting conductors, so as to shift the phase angle forward or backward and independently also increase or decrease the voltage, thereby to determine the direction of flow of the exchanged power.

While such a combination of induction regulators will give a smooth control of the exchanged power, where only a small range of control is necessary, they do not have range enough to control large amounts of power over a considerable phase angle. In either case, the expense is so great as to render their use prohibitive for most purposes. For these reasons, regulating transformers are usually employed to control large amounts of exchanged power.

Consequently an object of the present invention is the provision of a power control system involving regulating transformers or the equivalent by which more accurate control of the exchanged power over the interconnecting circuit between two alternating current generating and distributing systems can be obtained, regardless of a variable loading or scattered power generation taking place in either system and also regardless of any other point of interconnection between the systems.

In practice, phase matching is accomplished, as far as may be, by changing connections throughout the system in such manner as to alter the phase of the voltage of the system at the point of its connection with the circuit and to bring the system voltage approximately in phase with the circuit voltage. Such a method is obviously unsatisfactory and it is an object of the present invention to employ apparatus that can be adjusted independently of voltage matching and power control to bring the phase of the circuit voltage into coincidence with that of the system. Since there may be a great inherent phase difference, the phase-control, or quadrature, voltage can be varied by steps of relatively great voltage difference, while the power flow can be separately controlled by steps of small voltage difference.

Another object of the present invention is an alternating current generating and distributing system having a circuit over which power is transmitted to a second system and means including regulating transformers associated with the circuit by which the flow of power over the circuit can be regulated by a series of steps which are much smaller than can be obtained with the usual regulating transformer system, while retaining a wide range of regulation.

A further object of the invention is the provision of a regulating transformer which has, in addition to the usual taps, a certain number of other taps taken out intermediate to the usual taps and connected through cap changing equipment to the series transformers forming a part of the regulating equipment. With this arrangement a coarse control, for phase matching, can be obtained by supplying the series transformers with voltage obtained by shifting from one coarse tap to another and the fine control, for power-flow control, can be obtained by supplying the series transformers, or an additional set of series transformers, with voltage obtained by shifting from one of the intermediate taps to another.

A yet further object of the invention is to provide for the control of exchanged power by the use of the existing type of regulating transformers and supplemented by another set of series transformers having a different ratio of transformation to give considerably smaller buck or boost voltage, in phase and out of phase. Thus with a series transformer having a low secondary voltage, a very small change in voltage on the interconnecting circuit can be obtained for a relatively high voltage difference between adjacent taps of the tap changing or exciting transformer.

Another object of the invention comprises impressing a suitable voltage on the circuit that is in phase with the circuit voltage for matching the potential of the circuit with that of the system, impressing a second voltage of suitable magnitude that is out of phase with the circuit voltage for bringing the circuit voltage in phase with the system voltage, and impressing a third voltage that is out of phase with the system voltage by such an amount and is of such magnitude as to effect the flow of a predetermined amount of power in a predetermined direction in the circuit. Preferably the third voltage is variable by steps of small increments so as to obtain a precise control of power flow.

A further object of the invention is generally to improve upon the control of exchanged power between two interconnected generating and distributing systems.

While the invention will be primarily used on the universal three-phase system the invention is herein shown in all the figures as applied to a two phase four-conductor system for simplicity. The invention can also be applied to any polyphase system, in an obvious manner. In all the figures, the interconnecting conductors 10 and 12, representing phase A, and 14 and 16, representing phase B, are connected at the bottoms of the figures to a generating system, not shown, which exchanges power with a second system, not shown, that is connected to the conductors at the tops of the figures.

Figure 1:
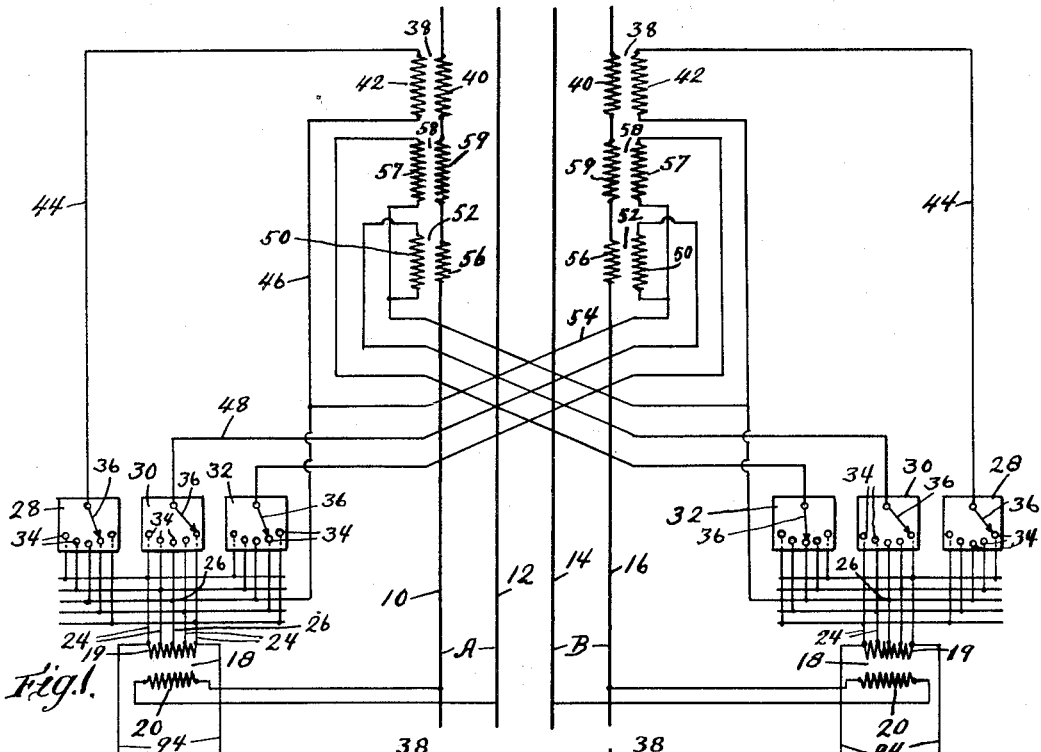
Fig. 1 is a diagram of the connection between the interconnecting circuit conductors and regulating transformers having the usual taps and wherein a fine degree of power control is obtained by the use of additional series transformers with the primary windings operating at the same voltage as the main series transformers but secondary windings designed for considerably lower voltage.

In Fig. 1, the source of variable voltage is shown as a tap-changing exciting transformer 18 with its primary or exciting winding 20 connected to the conductors 10 and 12 of phase A. A similar tap-changing transformer 18 has its primary 20 connected to the conductors 14 and 16 of phase B. Both transformers and their tap-changing switches are similar so that but one need be described. The transformer 18, in accordance with usual practice, has a secondary winding 19 provided with a relatively few number of taps 24 which are located on opposite sides of the mid or neutral tap 26 and uniformly electrically spaced along the length of the winding. Three tap-changing switches indicated in this and subsequent diagrams as simple multi-contact switches 28, 30 and 32 are provided which have stationary contacts 34 each connected to a separate one of all of the taps and movable contact members 36 that are engageable with any selected contact and are connected with the primary windings of certain series transformers. In practice these tap changers will preferably be of any standard tap-changing under load type.

There is an in-phase series transformer 38 having usually unitary ratio windings and arranged with its secondary 40 in series with the conductor 10. One end of the primary 42 is connected to the movable contact member 36 of the switch 28 by a conductor 44 and the other end to the neutral tap 26 of the exciting or tap changing transformer by the conductor 46. Thus, by varying the position of the movable contact member of the switch 28 to any selected tap on either side of the neutral tap, a variable in-phase buck or boost voltage can be impressed on the interconnecting conductor 10 of phase A.

In the same manner the tap-changing switch 28 of phase B, through the similar series transformer 38, controls the in-phase voltage of phase B through the phase conductor 16.

Power control and phase matching is effected by the tap-changing switches 30 and 32. The switch 30 of phase A has a movable contact member 36 connected by a conductor 48 with one end of the primary winding 50 of an out-phase series transformer 52, the other end of which winding is connected by a conductor 54 to the neutral tap 26 of the exciting transformer. The secondary winding 56 of said transformer 52 is in series with the conductor 16 of phase B. Similarly the tap-changing switch 30 of phase B controls the energization of the primary winding 50 of a similar transformer 52, the secondary winding 56 of which is in series with the conductor 10 of phase A. The cross-phase transformer connections thus are such that the superimposed voltage of the out-phase transformer in each phase is displaced 90° from the normal voltage of the phase conductors. Thus by varying the energization of said series transformers a variable out-phase voltage can be obtained which, combined with the in-phase voltage variation obtained from transformers 38 permits independent regulation of voltage and phase angle and the resulting control of power flow.

The tap-changing switch 32 of phase A has its movable contact member connected to one end of the primary winding 57 of the series transformer 58, the other end of said winding being connected to the neutral tap of the exciting transformer. The secondary winding 59 of said transformer 58 is in series with the conductor 16 of phase B. In the same manner the switch 30 of phase B controls the energization of the transformer 58 associated with the conductor 10 of phase A.

In accordance with this invention the transformers 58 have secondary windings which are designed for relatively high voltage, and the transformers 52 have secondary windings which are designed for relatively low voltage. Thus a shifting of the movable contact members of the switches 32 between any two consecutive taps will result in a large out-phase voltage change in the conductors 10 and 16 and a similar operation of the tap-changing switches 30 that control the transformers 52 will result in a relatively small out-phase voltage change in said conductors. Consequently with the combination of series transformers and tap-changing switches herein provided a fine degree of out-phase voltage and consequently of power flow can be obtained, and also the control of wide phase displacements due to causes external to the controlled circuit.

Since it is usually only necessary to have a finer control of the phase relations between the two interconnected systems than of the buck or boost voltage, I have shown in the figure the principle of this feature of the invention applied only to the out-phase transformers.

The term "in-phase transformer" is herein employed to designate a series transformer the primary of which is adapted to be energized by a potential that is in-phase with the potential of the circuit in which the secondary is connected. Similarly the term "out-phase transformer" refers to a series transformer the primary of which is adapted to be energized by a potential that is out of phase, or in quadrature, with the potential of the circuit in which the secondary is connected.

Figure 2:
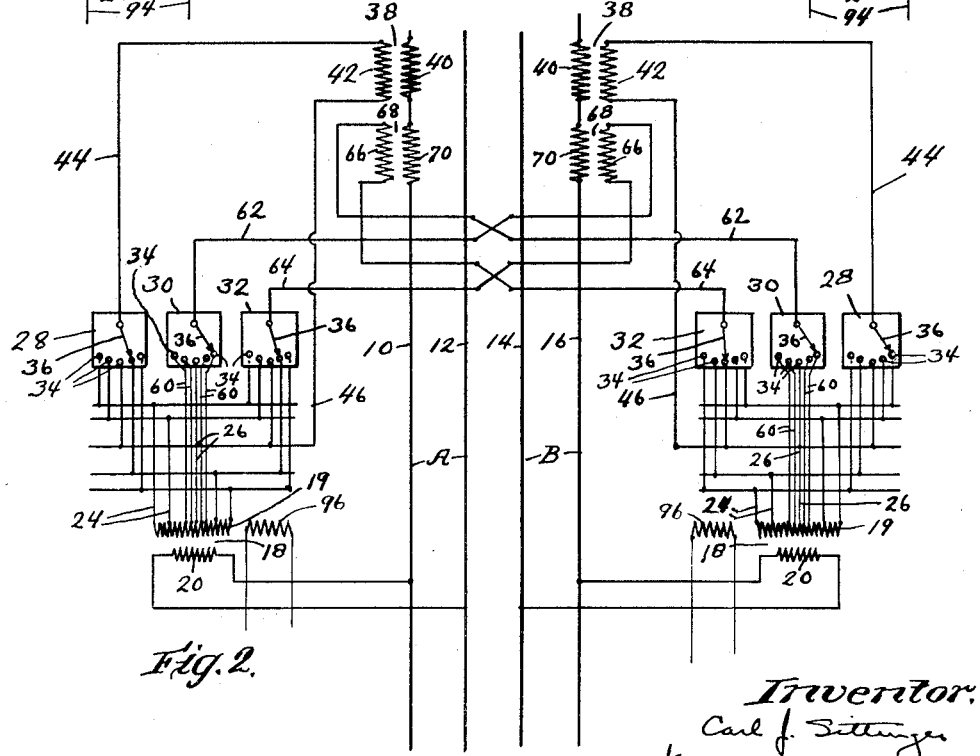
Fig. 2 is similar to Fig. 1 but shows regulating transformers having a number of taps some of which have small difference of potential between them and which energize series transformers of a design similar to that used in existing equipment.

In the modification illustrated in Fig. 2, the secondary 19 of the exciting transformer 18 has the usual coarse taps 24 on opposite sides of the neutral tap 26. In addition, there are a number of other taps 60 between the neutral tap and the adjacent innermost taps 24 that provide steps of small voltage variation. The coarse and neutral taps are connected, as heretofore, with the stationary contact members 34 of the two tap changing switches 28 and 32. The fine taps 60 and the neutral tap are connected with the stationary contact members 34 of the tap changing switch 30. The switch 28 controls the in-phase series transformer 38 as before, the primary winding 42 of which is connected to the movable contact member of the tap-changing switch by the conductor 44 and to the neutral tap by the conductor 46. This arrangement is similar for both phases A and B.

The movable contact member 36 of the switches 30 and 32 of phase A are connected by conductors 62 and 64 with the primary winding 66 of an out-phase series transformer 68 the secondary winding 70 of which is in series with the conductor 16 of phase B. In the same way the similar switches of phase B control the energization of similar out-phase transformers 68 in phase A.

With the above arrangement coarse regulation of the out-phase voltage is obtained by the switch 32, which varies the voltage by the coarse steps provided by the taps 24 to permit control of wide phase displacements due to causes external to the controlled circuit. Fine regulation is obtained by the switch 30 which varies the voltage by the fine steps provided by the taps 60, permitting correspondingly accurate control of power flow. Thus the phase angle can be adjusted widely within close limits. The switch 30 can also connect the out-phase transformer on either side of the neutral tap thus in effect to shift the position of the neutral for greater advantage in matching the interconnected systems or for more uniform control if the interchange of power is greater in one direction than another.

While usually not necessary, a fourth tap-changing switch, not shown, can be connected to the fine taps 26 and the in-phase transformers 38, related similarly to switches 30 and transformers 68 thereby to obtain also a finer degree of in-phase voltage control.

Figure 3:
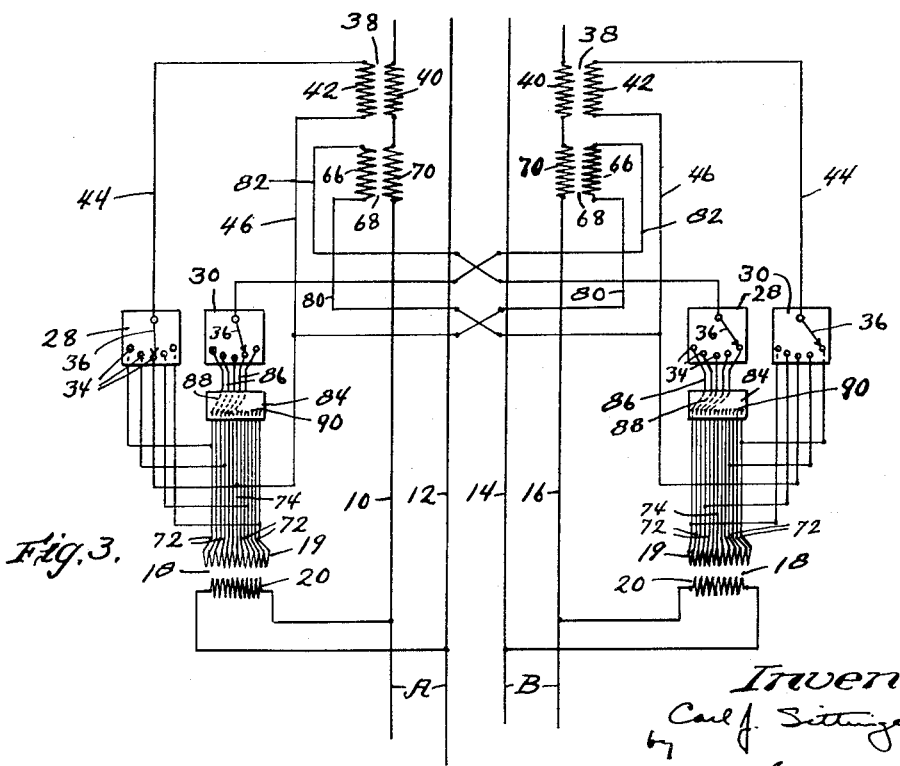

In the modification illustrated in Fig. 3, the secondary 19 of the exciting transformer 18 is provided with a large number, say 80 or 100, taps 72 and the neutral tap 74. A tap-changing switch 28 has its stationary contact members 34 connected to a few taps which are preferably equally spaced along the length of the secondary winding so as to provide coarse steps of relatively great voltage difference as compared with the voltage between any two consecutive taps. The switch is connected as before by the conductor 44 to one end of the primary winding 42 of the in-phase current transformer 38 having its secondary winding 40 in series with the interconnecting conductor 10 of phase A. The other end of the primary winding is connected by a conductor 46 to the neutral tap 74. This arrangement, as before, controls the amount of in-phase buck or boost voltage of phase A. The arrangement is similar in phase B for the control of in-phase voltage. The out-phase voltage in phase B is controlled by an out-phase transformer 68 having its secondary winding 66 in series with conductor 16 and its primary winding 70 energized by the exciting transformer of phase A through a tap changing switch 30, one end of said winding being connected to the neutral tap 74 by a conductor 80 and the other end being connected to the movable contact member 36 of said switch by a conductor 82. The stationary contact members 34 of said switch 30, instead of being fixedly connected to the taps of the exciting transformer, as heretofore, are arranged for connection with any selected group of consecutive taps. To this end the connections pass through an interposed switch controller or commutator 84. The contact members 34 are connected by separate conductors 86 to a similar number of insulated contacts 88 of the commutator, which contacts ride over and engage a plurality of stationary contacts 90, successive contacts being connected with successive taps of the exciting transformers. Thus the manipulation of the switch 30 varies the energization of the out-phase transformer 70 by the small voltage steps provided by the close taps of the exciting transformer, up to the range provided by the number of fixed contact members of the switch, thus providing a fine degree of phase angle control and correspondingly accurate control of power flow. The commutator 84 can be adjusted to connect the input side of the tap-changing switch 30 to the particular sequence of taps that is found to give the desired results, to permit the control of wide phase displacements due to causes external to the controlled circuit. In this case, also, as in Figs. 1 and 2, the fine control may, if desired, be applied to the in-phase transformers.

Figure 4:
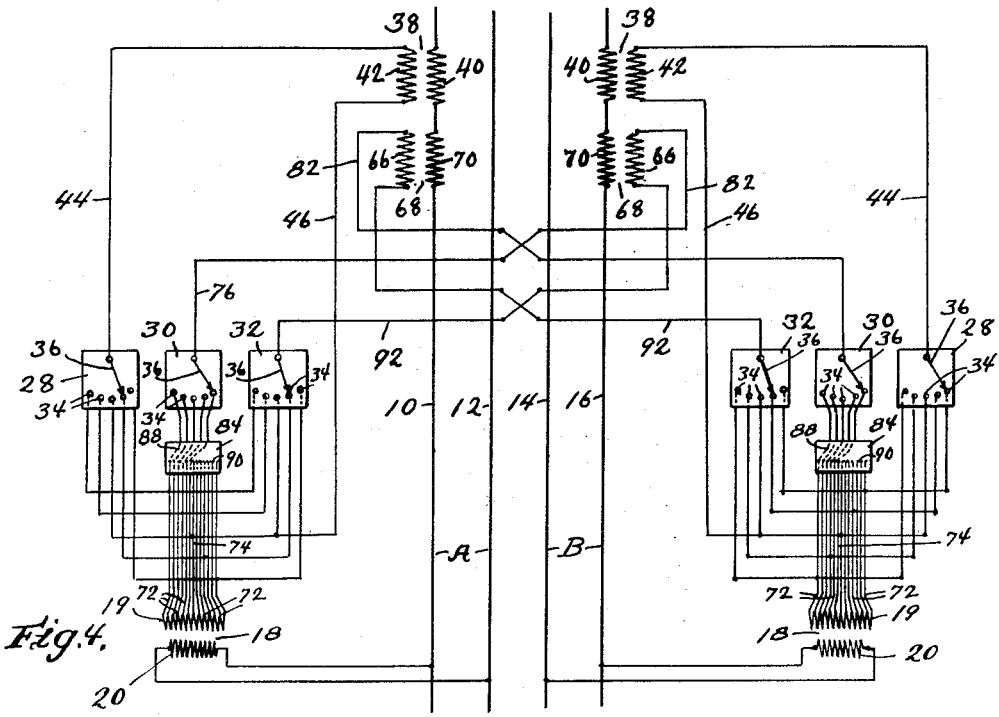
Figs. 3 and 4 are modifications of Fig. 2.

In the modification illustrated in Fig. 4, the arrangement is a combination of the arrangements of Fig. 2 and Fig. 3 wherein Fig. 3 is modified by the insertion of tap-changing switches 32 in the return conductors 92 from the out-phase transformers 68. The switch is connected to the same, or similarly spaced, taps as the switches 28 of Fig. 3. While this modification may be operated either under the principles outlined in Figs. 2 and 3, the combination permits the control of twice the phase angle and power flow control for the same capacity transformers; or, for the same amount of phase angle and power control, the capacity of the transformers may be reduced one half because the full range of the transformers, in either direction, can be utilized.

In Fig. 4, as in the previous figures, the fine control may, if desired, be applied also to the in-phase transformers.

In all of these modifications, the arrangement of the connections for phase B is or can be the same as for phase A of the corresponding figure.

The arrangements above described for obtaining a fine control of out-phase voltage can equally be applied to the fine controls of in-phase voltage.

While the tap-changing switches are here shown diagrammatically as being manually operable, in practice they will preferably be automatically, electrically, or otherwise operated for tap-changing under load and may assume any suitable construction which, however, is of no importance so far as the present invention is concerned.

While it is customary to obtain a variable voltage by an exciting transformer as herein described, a variable voltage can be obtained by other well known apparatus, as auto-transformers, or from secondary or tertiary windings of power transformers and the like; and in the claims the term exciting or tap-changing transformer is intended to include such equivalent means. The various appurtenances necessary may be either self-contained within a single housing or may be subdivided into two or more component parts, as may be usual or necessary.

In Fig. 1 the exciting transformer can be used to supply a load, the load conductors 94 being connected to the secondary windings 18. In Fig. 2 the load is applied by power windings 96 which are inductively related to the primary windings 20.

I claim:

1. In an alternating current distribution system, a circuit over which power is transmitted, and means to regulate the transmitted power including an exciting transformer having a primary winding which is energized from the system and a tapped secondary winding, two series transformers having primary windings energized from said tapped secondary winding and having secondary windings which are in series with said circuit, and means independently to vary the voltages impressed on said series transformer primary windings by said tapped secondary winding, said series transformers having different transformation ratios whereby their effects on the circuit are different.

2. In an alternating current distribution system, a circuit over which power is transmitted, and means to regulate the transmitted power including an exciting transformer having a primary winding which is energized from the system and a tapped secondary winding, two series transformers having primary windings energized from said tapped secondary winding, and secondary windings which are in series with said circuit, and means independently to vary the voltages impressed on said series transformer primary windings by said tapped secondary winding, said series transformers having different transformation ratios whereby their effects on the circuit are different, one of said series transformers having a high transformation ratio and the other having a low transformation ratio whereby fine and coarse variations of voltage can be impressed on the circuit.

3. In an alternating current distribution system, a circuit over which power is transmitted, and means to regulate the transmitted power comprising two series transformers having primary and secondary windings of high and low transformation ratio respectively with the secondary windings in series with the circuit, and means to supply said primary windings independently with variable voltages.

4. In an alternating current distribution system, a circuit over which power is transmitted, and means to regulate the transmitted power comprising two series transformers having primary and secondary windings of high and low transformation ratio respectively with the secondary windings in series with the circuit, and means to supply said primary windings independently with variable voltages which have the same phase relation and are out of phase with the normal voltage of the circuit.

5. In an alternating current distribution system, a circuit conductor over which power is transmitted, energized at a voltage that is out of phase with the voltage of the system where it is connected therewith, and means to vary the amount of the transmitted power including a combination of series transformers each having a primary winding and a secondary winding that is in series with said circuit conductor, and means to impress independently-controllable variable alternating potentials that are of the same phase relation but are out of phase with the potential of said circuit conductor independently across the terminals of said primary windings, one to adjust the phase of the voltage of the circuit with that of the system and the other to control the flow of power in the circuit.

6. In an alternating current distribution system, a circuit conductor over which power is transmitted, and means to vary the amount of the transmitted power including a combination of series transformers each having a primary winding and a secondary winding that is in series with said conductor, and means to impress variable alternating potentials of the same phase relation independently across the terminals of said primary windings, including an exciting transformer having a primary winding energized from the system and a tapped secondary winding, and means including a tap changing switch which connects the primary windings of said series transformers with any selected tap of said tapped secondary.

7. In an alternating current distribution system, a circuit over which power is transmitted, means to vary the amount of transmitted power including an exciting transformer having a primary winding that is energized from the system and a secondary winding that is provided with a plurality of taps that have relatively great potential difference between consecutive taps, means for superimposing the voltage across selected taps upon the voltage of said conductor, and means which modifies the effect of the voltage differences between said taps on said conductor.

8. In an alternating current distribution system, a circuit over which power is transmitted, means to vary the amount of transmitted power including an exciting transformer having a primary winding that is energized from the system and a secondary winding that is provided with a plurality of taps that have relatively great potential differences between consecutive taps, means for superimposing the voltage across selected taps upon the voltage of said conductor, and inductive means which reduces the effect of the voltage differences between said taps on said conductor.

9. In an alternating current distribution system, a circuit over which power is transmitted, and means to control the amount of transmitted power including means which superimposes an out-phase potential upon the potential of said conductor, means which varies the amount of superimposed potential by definite steps of relatively great potential difference to match the phase of the voltage of the circuit with that of the system, and other means which varies said superimposed potential by definite steps of small potential difference to adjust the flow of power over the circuit.

10. In an alternating current distribution system, a circuit over which power is transmitted, and means including an exciting transformer which superimposes definite steps of small voltage differences upon the voltage of said circuit and other means also including said transformer which superimposes definite steps of large voltage differences upon said circuit independently of and in phase with said first superimposed voltage.

11. In an alternating current distribution system, an outgoing circuit over which power is transmitted, means for superimposing a variable voltage on said circuit, which voltage is in phase with said circuit voltage, for varying said circuit voltage and means for superimposing a variable voltage upon the voltage of said circuit, which superimposed voltage is out of phase with said circuit voltage including an exciting transformer having a secondary winding which is provided with a plurality of widely spaced taps and also with a plurality of closely spaced taps that are located on both sides of the electrical middle of the secondary winding and provide different voltages that are in phase with each other, a series transformer having a primary winding which is adapted to be energized from said tapped secondary and a secondary winding which is in series with said circuit, means including a tap changing switch that is in the circuit of said primary winding and connects said primary winding to a selected one of said closely spaced taps mainly for varying the power transmitted over said circuit, and means including a second tap changing switch which is also in the circuit of said primary winding for connecting said winding to a selected one of said widely spaced taps for varying the phase angle of the circuit voltage.

12. In a multi-phase alternating current distribution system, a multi-phase circuit over which power is transmitted, an exciting transformer having a tapped secondary winding, inductive means energized by said tapped secondary and which superimposes a variable in-phase voltage upon the voltage of said system, means including a tap changing switch which connects said inductive means between selected taps of said tapped secondary whereby to vary the amount of superimposed voltage, other inductive means energized from said tapped secondary and which superimposes a variable out-phase voltage on said circuit, and means including said last named inductive means and said tapped secondary and a second tap changing switch to connect said last named inductive means between selected taps of said tapped secondary and to provide for the variation of superimposed out-phase voltage by definite steps of relatively small voltage difference.

13. In an alternating current distribution system, a source of power, a load circuit, a transmission circuit connecting said source and load circuit, means to adjust the voltage of said transmission circuit to that of said load circuit, and means to adjust the phase relation of said transmission circuit to that of said load circuit comprising means to shift the voltage of said transmission circuit by steps of large angular displacement, and means to control the flow of power over said transmission circuit comprising means independent of said phase controlling means to shift the voltage of said transmission circuit by steps of small angular displacement.

14. In an alternating current distribution system having a circuit over which power is adapted to be transmitted between two points of the system that have different voltages that are out of phase, means for impressing upon the circuit a voltage of such magnitude as to establish equal voltages between the circuit and the points of the system to which the circuit is connected, means for impressing upon the circuit a voltage of such magnitude and angular relation with respect to the phase differences between the voltages of the two points of the system as to establish the same phase relation between voltages of the circuit and the two points of the system at the connections therebetween, and means for impressing upon the circuit a voltage which is of such magnitude and angular relation with respect to the magnitude and angular relation of the connected circuit voltage as to effect a flow of a desired amount of power in a desired direction over the circuit.

15. In an alternating current distribution system having a circuit over which power is adapted to be transmitted between two points of the system that have different voltages that are out of phase, means for impressing a voltage on the circuit for matching the magnitude of voltages of the circuit and the system, means for impressing a voltage on the circuit for matching the phase relations of the voltages of the circuit and the system, and means for impressing a voltage on the circuit for controlling the flow of power over the circuit.

16. In an alternating current distribution system having a circuit over which power is adapted to be transmitted between two points of the system that have different voltages that are out of phase, means for impressing a voltage on the circuit for matching the voltage of the circuit to that of the system, means for impressing a voltage on the circuit for matching the phase relation of the voltages of the circuit and the system, and means for impressing a voltage on the circuit that is out of phase with respect to the circuit voltage and is of such magnitude as to determine the flow of a predetermined amount of power in a predetermined direction over the circuit.

17. A distribution system as defined in claim 14 wherein the means for impressing a voltage that establishes the same phase relation between the voltages of the circuit and the system also includes means for varying the impressed voltage by steps of large voltage difference, and wherein the means for impressing a voltage for controlling the flow of power over the circuit also includes means for varying the impressed voltage by steps of small voltage difference.

18. In an alternating current distribution system having a circuit over which power is adapted to be transmitted between two points of the system that have voltages that are out of phase, means for impressing on the system a voltage having such phase relation with respect to the circuit voltage as to bring the circuit voltage into phase with the system voltage, and means for impressing on the circuit a voltage of such magnitude and phase characteristic as to determine the amount and direction of power flow in the circuit.

19. A system as defined in claim 14 wherein all of said means include an exciting transformer energized from the system as the voltage source.

20. In an alternating current distribution system having a circuit over which power is adapted to be transmitted between two points of the system that have different voltages that are out of phase, an exciting transformer energized from the system having a plurality of taps providing varying degrees of voltage, means including a tap-changing switch for impressing on the circuit selected voltages that are derived from said transformer and are in phase with the circuit voltage and are of such magnitude as to match the voltage of the circuit with the voltage of the system at their point of interconnection, means including a second tap-changing switch for impressing on the circuit selected voltages derived from said transformer that are out of phase with the circuit voltage and are of such magnitude as to bring the phase relation of the circuit voltage into coincidence with that of the system, and means including a third tap-changing switch for impressing on the circuit selected voltages derived from said transformer that are out of phase with the circuit voltage and are of such magnitude as to control the amount and direction of flow of power in the circuit in a predetermined manner.

CARL J. SITTINGER.